US008942965B2

(12) United States Patent
Bourgeois et al.

(10) Patent No.: US 8,942,965 B2
(45) Date of Patent: Jan. 27, 2015

(54) SYSTEM AND METHOD FOR UNDERWATER VEHICLE SIMULATION

(75) Inventors: Brian S. Bourgeois, Slidell, LA (US); Samantha J. Zambo, Picayune, MS (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 387 days.

(21) Appl. No.: 13/402,544

(22) Filed: Feb. 22, 2012

(65) Prior Publication Data
US 2013/0218543 A1 Aug. 22, 2013

(51) Int. Cl.
G06G 7/48 (2006.01)
(52) U.S. Cl.
USPC .............................................. 703/8
(58) Field of Classification Search
USPC .............................................. 703/8
See application file for complete search history.

(56) References Cited

PUBLICATIONS

Duarte, Christiane N., et al. "A Common Control Language to support multiple cooperating AUVs." Proceedings of the 14th International Symposium on Unmanned Untethered Submersible Technology, 2005; pp. 1-9 (D).*
Friend: The Design of a Navigator for a Testbed Autonomous Underwater Vehicle MS thesis; Naval Postgraduate School. Monterey, California; 228 pages; 1989. (F).*
Erol et al.; AUV-Aided Localization for Underwater Sensor Networks; IEEE; International Conference on Wireless Algorithms, Systems and Applications; pp. 44-51; 2007 (E).*
Periasamy et al.; Controller Design for Manipulator Trajectory Control of an AUV- Manipulator System; 2008 IEEE Region 10 Colloquium—3rd Int. Con. Indust. & Inf. Sys.; 2008; pp. 1-6. (P).*
Evans et al.; Dynamics modeling and performance evaluation of an autonomous underwater vehicle; Ocean Engineering 31 (2004) pp. 1835-1858. (Ev).*
Fryxell et al.; Navigation, Guidance and Control of AUVs: An Application to the Marius Vehicle; Control Eng. Practice, Vol. 4, No. 3, pp. 401-409, 1996. (Fr).*
Miller et al.; Autonomous Underwater Vehicle Navigation; IEEE Journal of Oceanic Engineering, vol. 35, No. 3, Jul. 2010; pp. 663-678. (M).*
Sanyal et al.; Robust Feedback Tracking of Autonomous Underwater Vehicles with Disturbance Rejection; 2009 American Control Conference; 2009; pp. 3585-3590. (S).*
Yakimenko et al.; AUV Rendezvous Trajectories Generation for Underwater Recovery; 16th Mediterranean Conference on Control and Automation; 2008; pp. 1192-1197 (Y).*
Barisic et al.; Kinematic Simulative Analysis of Virtual Potential Field Method for AUV Trajectory Planning;Control & Automation, 2007. MED '07. Mediterranean Conference on , vol., No., pp. 1,6, Jun. 27-29, 2007; pp. 1-6. (B).*
Li et al.: Neural Net Based Nonlinear Adaptive Control for Autonomous Underwater Vehicles; Proceedings of the 2002 IEEE international Conference on Robotics 8 Automation; Washington, DC May 2002; pp. 1075-1080. (L).*
Komerska, Bourgeois, Chappel, Mission Planning using the Common Control Language (CCL) in the NAVOCEANO Mission Planning / Mission Monitoring (MP/MM) Application Domain, AUSI Technical Report TR-0802-01, Jan. 9, 2008, ten pages.

* cited by examiner

*Primary Examiner* — Hugh Jones
(74) *Attorney, Agent, or Firm* — US Naval Research Laboratory; Kathleen Chapman

(57) ABSTRACT

System and method for using forecast ocean currents to improve the prediction of an underwater vessel's trajectory as compared to using a simple dead reckoned path determined by vessel commanded heading and speed through the water. System and method include a motion model specific to underwater gliders that incorporates 4d forecast currents.

14 Claims, 12 Drawing Sheets
(7 of 12 Drawing Sheet(s) Filed in Color)

SYSTEM AND METHOD FOR UNDERWATER VEHICLE SIMULATION

CROSS-REFERENCE TO RELATED APPLICATIONS

Not applicable.

BACKGROUND

Methods and systems disclosed herein relate generally to predicting a vessel's trajectory, and more specifically, to predicting the trajectory of an underwater vehicle.

Daily global ocean forecasts that include a four-dimensional (4d) (latitude, longitude, depth, and time) estimation of ocean currents can be generated. An approach taken for the estimation of vehicle position over time is to start with a known position from infrequent fixes (Global Positioning System (GPS), Ultra-short Baseline (USBL), terrain-based, etc.) and use the vector sum of the vehicle velocity (heading and speed through the water) with the forecast current.

Validation of this approach can be accomplished using log data that was received from underwater gliders which provides GPS positions at each dive and surfacing point. An underwater glider propels itself using a buoyancy engine and wings that create lift to produce horizontal motion. From a vehicle motion modeling perspective, an underwater glider must have vertical motion to move horizontally. Since underwater gliders do not use engines for propulsion they generally have substantial endurance suitable for ocean sampling, underwater plume tracking, and sustained surveillance. However, these vessels are slow, with sustained horizontal speeds typically below 0.5 m/s, and navigating them is challenging as ocean currents can exceed 2 m/s.

The Naval Coastal Ocean Model (NCOM) was developed to generate daily global ocean forecasts predicting temperature, salinity and currents. FIGS. 1 and 2 show representative current forecasts during underwater glider deployment exercises. In these figures color 303 represents current speed in m/s and arrows 301 indicate the current direction. FIG. 1 shows the current at the surface with speeds as great as 0.8 m/s. FIG. 2 shows the current at 1000 m, the maximum depth of the glider dives, where the speed is predominately below 0.02 m/s.

Position estimation for underwater vehicles operating in the open ocean can be problematic with existing technologies. Use of GPS can require the vehicle to surface periodically which poses a potential navigation hazard and subjects the vehicle to the faster currents near the surface. Inertial systems can be ineffective without the use of Doppler Velocity Logs (DVL) whose ranges can be too limited for deep ocean operation unless the vehicle is very near the seafloor. Surface or bottom mounted transponder systems can be expensive to deploy and restrict the geographic area that the vehicle can operate in. A ship equipped with a USBL system can be used to track an underwater vehicle, which can be an expensive option for long deployments.

A complication in the open ocean is that position estimation is problematic while submerged. Glider depth can be directly measured by the vehicle using a pressure sensor. Vertical velocity can be derived from depth versus time, and horizontal speed through the water can be estimated given vertical velocity, vehicle pitch angle and a parameterized hydrodynamic model for the vehicle. Consequently, the only certain position information, for purpose of simulation, is depth (as a function of time), the time of the dive and the starting and ending surface positions. In the present embodiment, the motion model can use initial simplifying assumptions including zero hydrodynamic slip between the vehicle and ocean current and a symmetric V shaped flight trajectory. For the simulations conducted, the maximum depth of the dive and the time of the dive can be used to compute an estimate of a single vertical velocity. Beyond this model, sources of error in position prediction can include errors in the forecast currents, hydrodynamic slip and deviations of the vehicle from the commanded heading, horizontal and vertical speeds. Variations in the vehicle commanded motion can include factors such as putting the processor to sleep periodically to save power (so heading is not strictly maintained), variations in vertical speed due to changes in water density, and other than symmetric dive profiles.

What are needed are a system and method for estimating the vessel's position while it is underwater that improves on a simple straight line dead-reckoned estimate.

SUMMARY

The system and method of the present embodiment use forecast ocean currents to improve the prediction of an underwater vessel's trajectory as compared to using a simple dead reckoned path determined by vessel commanded heading and speed through the water. The methodology presented includes a parametric approach to reducing simulation position prediction error. Simulator performance is evaluated by comparing the actual and simulated surfacing position of underwater gliders. The present teachings also include a motion model specific to underwater gliders that incorporates 4d forecast currents.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

These solutions and other advantages are achieved by the various embodiments of the teachings described herein below.

For the present embodiment, a command that specifies the minimum and maximum depth of the dive, an independent ascent and descent speed, target waypoint and waypoint radius can include a standard, implementation independent command for gliders, shown below.

REQUEST YOYO
MIN_DEPTH 0
MAX_DEPTH 1000.0
ASCENT_SPEED 20
DESCENT_SPEED 20
MAX_GLIDE_SLOPE 30
LAT_LNG 30.13200-85.86350
RADIUS 50

One of two other parameters, either MAX_GLIDE_SLOPE [deg] or MAX_HORIZ_SPEED[cm/s] can be used to define the shape of the glider's triangular vertical trajectory.

The simulation can also include the ability to pursue a series of waypoints, sequence waypoints either on the surface or while submerged, and to model the motion of the glider while drifting on the surface for communicating with the command center. With these features, the simulation can be used to estimate the next surfacing position of the vehicle given the forecast current and its commanded heading and speed, and its position as a function of time while submerged. This simulation can also be suitable to support research for the determination of optimal glider trajectories that take advantage of 4d ocean currents to minimize time and energy.

The present embodiment can compensate for simulation position error using heading bias and horizontal speed factor applied to the glider's motion through the water. These can be used for each dive to minimize the prediction error. Since the glider position is certain only when it is on the surface, the position prediction error is based on the distance between where a glider actually surfaced and where the simulation predicted that it would surface. A normalized prediction error—the distance between the actual surface position and the simulation predicted surface position, divided by the linear distance between the position at the start of the dive and the actual surfacing position—can be used.

Figure 1:
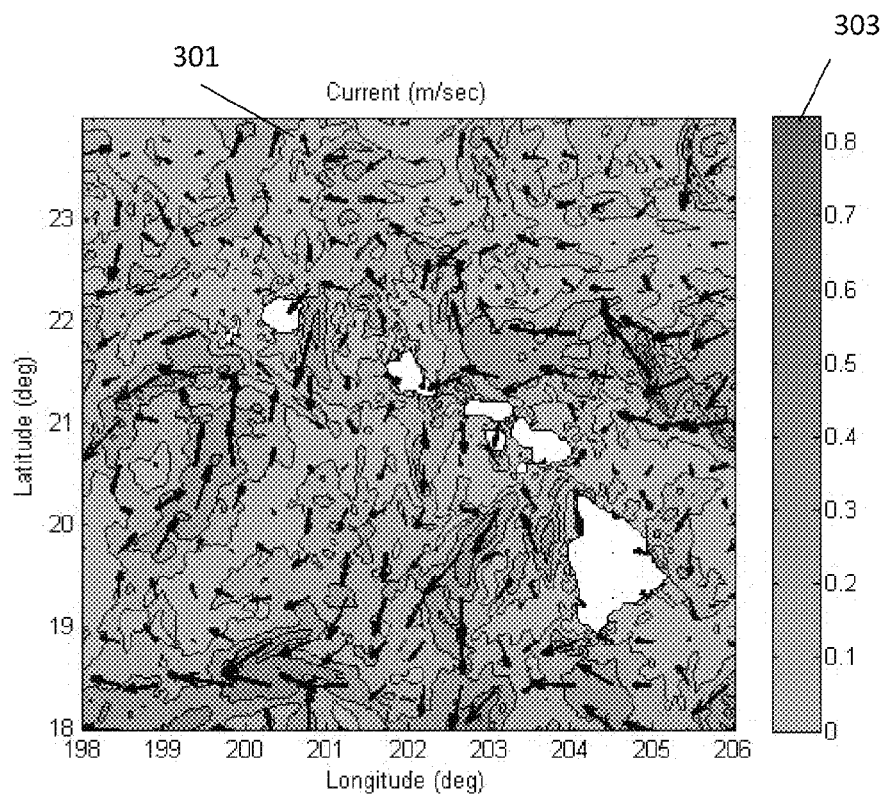
FIG. 1 is a screen shot of a Hawaii area NCOM numerical model current forecast at the ocean surface.
Figure 2:
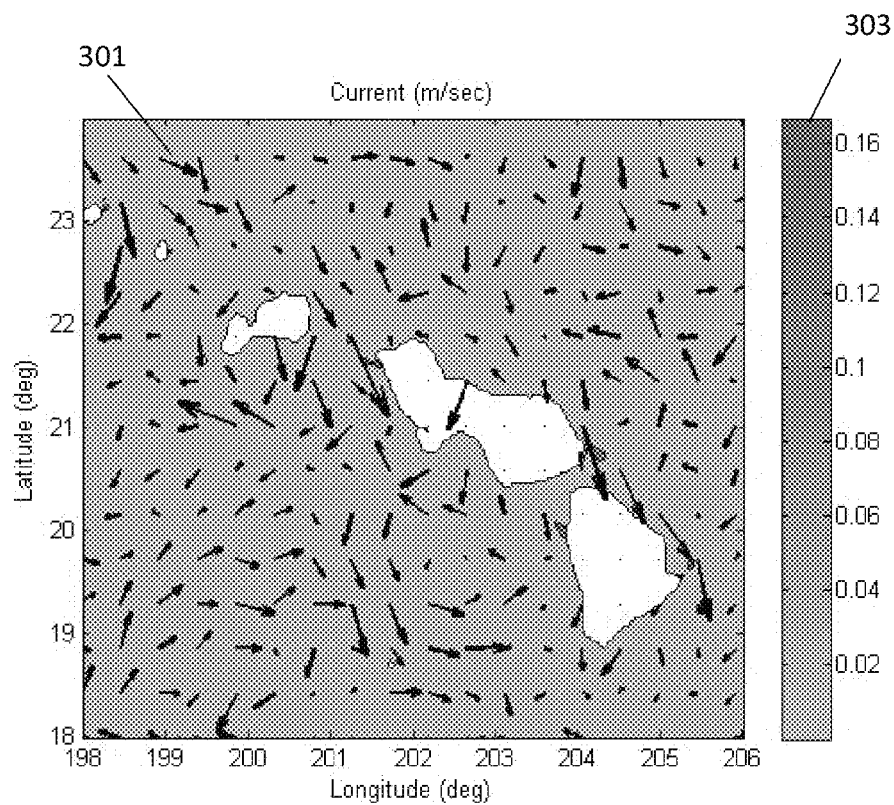
FIG. 2 is a screen shot of the Hawaii area NCOM numerical model current forecast at 1000 m below the ocean surface.
Figure 3A:
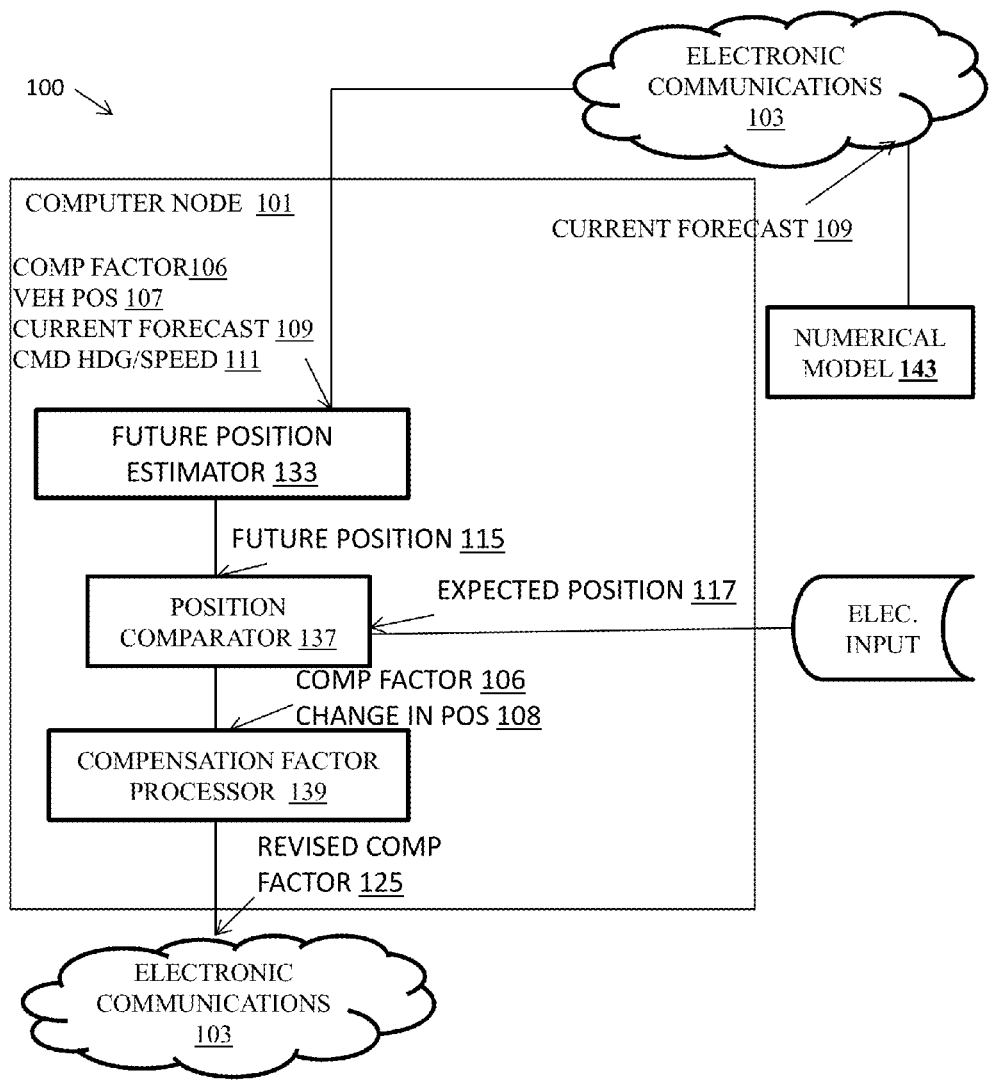
FIG. 3A is a schematic block diagram of the system one embodiment of the present teachings.

Referring now to FIG. 3A, system 100 for reducing simulation prediction error can include, but is not limited to including, computer node 101 communicating with electronic communications 103 and executing computer components including, but not limited to, future position estimator 133 estimating future position 115 of an underwater vehicle based on a forecast ocean current 109 received from, for example, but not limited to, numerical model 143, commanded heading and speed 111 of the vehicle, position 107 of the vehicle at a specific time while submerged, and dynamic compensation factor 106, position comparator 137 comparing future position 115 compared to expected position 117 received from any source of input to computer node 101 including, but not limited to electronic communications 103, and compensation factor processor 139 revising dynamic compensation factor 106 based on the step of comparing and providing revised dynamic compensation factor 125 to reduce the simulation prediction error to, for example, but not limited to electronic communications 103.

Figure 3B:
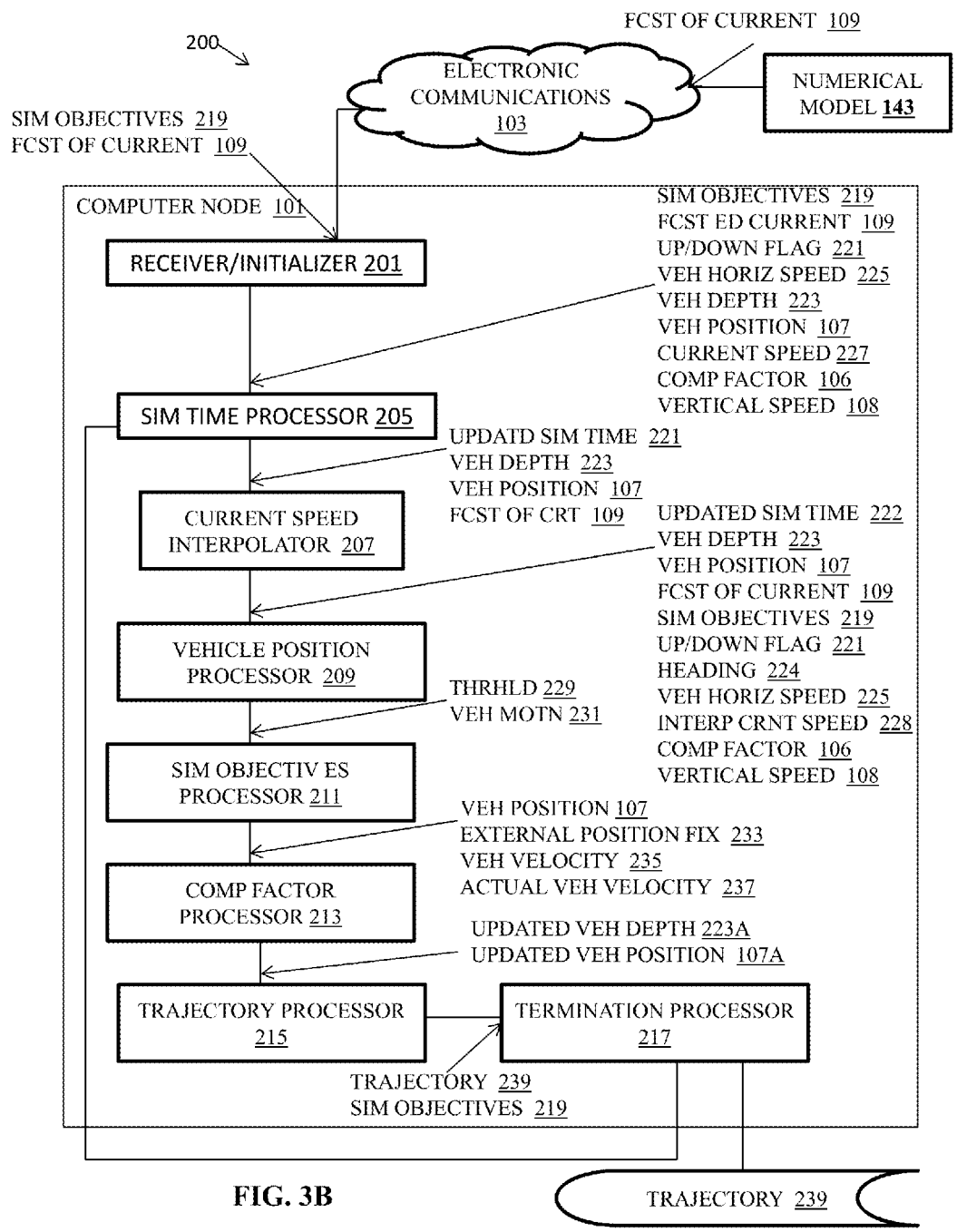
FIG. 3B is a schematic block diagram of the system another embodiment of the present teachings.

Referring now to FIG. 3B, system 200 for simulating a trajectory for a vehicle in a 4d fluid current field can include, but is not limited to including, receiver/initializer 201 receiving simulation objectives 219, and also forecasted current speed 109 from, for example, but not limited to, numerical model 143 through electronics communications 103 into computer node 101, and initializing a simulation time, heading 224 of the vehicle, up/down flag 221, current speed 227, vehicle motion of the vehicle, dynamic compensation factor 106, vehicle position 107 of the vehicle, vertical speed 108, and vehicle depth 223 of the vehicle. System 200 can also include simulation time processor 205 updating the simulation time in the electronic computer, and current speed interpolator 207 interpolating, in the electronic computer, current speed 227 based on updated simulation time 222, vehicle depth 223, vehicle position 107, and forecast 109 of the current speed. System 200 can further include vehicle position processor 209 computing, in the electronic computer, vehicle depth 223 based on updated simulation time 222, up/down flag 221, simulation objectives 219, and vertical speed 108 of the vehicle, and computing, in the electronic computer, vehicle position 107 based on updated simulation time 222, heading 224, horizontal speed 225, the interpolated current speed 228, dynamic compensation factor 106, and simulation objectives 219. System 200 can also include simulation objectives processor 211 updating, in the electronic computer, simulation objectives 219 if threshold 229 is met and vehicle motion 231 is not drift mode. System 200 can include compensation factor processor 213 computing, in the electronic computer, dynamic compensation factor 106 based on vehicle velocity 235 of the vehicle, vehicle position 107, external position fix 233 of the vehicle position, and actual velocity 237 of the vehicle, and can include trajectory processor 215 computing, in the electronic computer, trajectory 239 based on updated vehicle depth 223A and updated vehicle position 107A. System 200 can also include termination processor 217 terminating if termination criterion(a) is/are met and returning, in the electronic computer, to simulation time processor 205 if termination criterion(a) is/are not met. Termination processor 217 can provide trajectory 239 to any form of output including, but not limited to electronic communications 103.

Receiver/initializer 201 can optionally receive simulation objectives selected from a group consisting of maximum depth, minimum depth, ascent rate, descent rate, and waypoints, and selecting the external position fix from a group consisting of a global positioning system position fix, an ultra-short baseline position fix, and a long baseline position fix. Current speed interpolator 207 can optionally select a working bounding box from a second bounding box of forecast data from the forecast created if the vehicle position is not within an original bounding box of the forecast data, and the original bounding box, and can interpolate the current speed based on the distance between the vehicle position and the working bounding box for each dimension of the working bounding box and pre-selected of U/V values in the bounding box. Current speed interpolator 207 can also optionally select sixteen bounding points, and fetch U/V values from the forecast data within the sixteen bounding points.

Figure 4A:
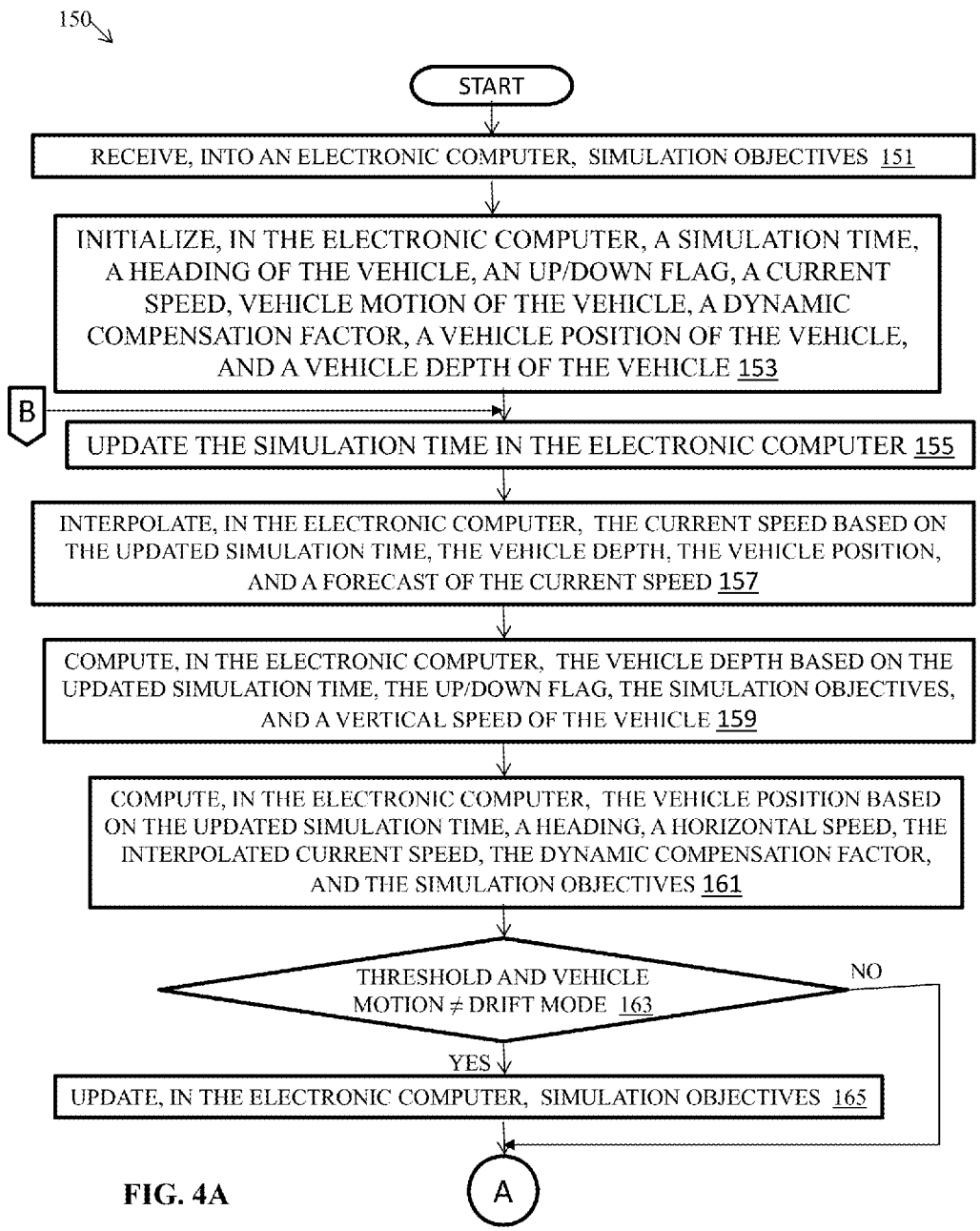
FIGS. 4A and 4B are flowcharts of the method of the present embodiment.
Figure 4B:
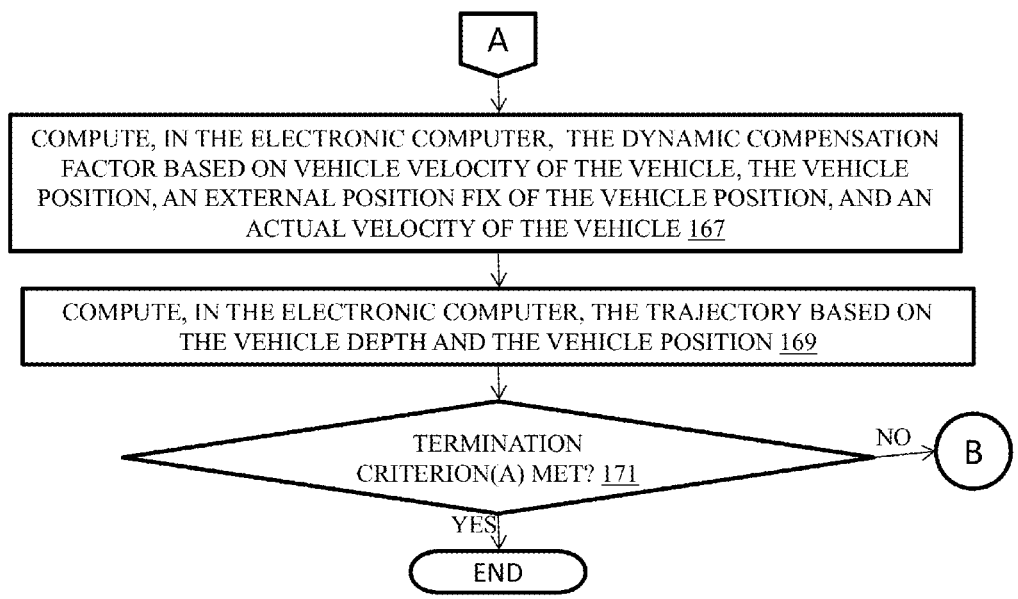

Referring now to FIGS. 4A and 4B, method 150 for simulating a trajectory for a vehicle in a 4d fluid current field can include, but is not limited to including, the steps of receiving 151, into an electronic computer, simulation objectives and forecasted current speed, initializing 153, in the electronic computer, a simulation time, a heading of the vehicle, an up/down flag, a current speed, vehicle motion of the vehicle, a dynamic compensation factor 106, a vehicle position of the vehicle, a horizontal speed of the vehicle, a vertical speed of the vehicle, and a vehicle depth of the vehicle, updating 155 the simulation time in the electronic computer, interpolating 157, in the electronic computer, the current speed based on the updated simulation time, the vehicle depth, the vehicle position, and a forecast of the current speed, computing 159, in the electronic computer, the vehicle depth based on the updated simulation time, the up/down flag, the simulation objectives, and vertical speed of the vehicle, and computing

161, in the electronic computer, the vehicle position based on the updated simulation time, a heading, a horizontal speed, the interpolated current speed, the dynamic compensation factor, and the simulation objectives. If 163 a threshold is met and the vehicle motion is not drift mode, method 150 can further include the step of updating 165, in the electronic computer, the simulation objectives. Method 150 can still further include the steps of computing 167, in the electronic computer, the dynamic compensation factor based on vehicle velocity of the vehicle, the vehicle position, an external position fix of the vehicle position, and an actual velocity of the vehicle, and computing 169, in the electronic computer, the trajectory based on the vehicle depth and the vehicle position. If 171 a termination criterion(a) is/are met, method 150 can further include the step of repeating, in the electronic computer, steps 155-171.

Method 150 can optionally include the steps of selecting the simulation objectives from a group consisting of maximum depth, minimum depth, ascent rate, descent rate, and waypoints, and selecting the external position fix from a group consisting of a global positioning system position fix, an ultra-short baseline position fix, and a long baseline position fix. Step 157 can include the steps of selecting a working bounding box from a second bounding box of forecast data from the forecast created if the vehicle position is not within an original bounding box of the forecast data, and the original bounding box, and interpolating the current speed based on the distance between the vehicle position and the working bounding box for each dimension of the working bounding box and pre-selected of U/V values in the bounding box. The step of selecting the working bounding box can include the steps of selecting sixteen bounding points, and fetching U/V values from the forecast data within the sixteen bounding points.

Figure 5:
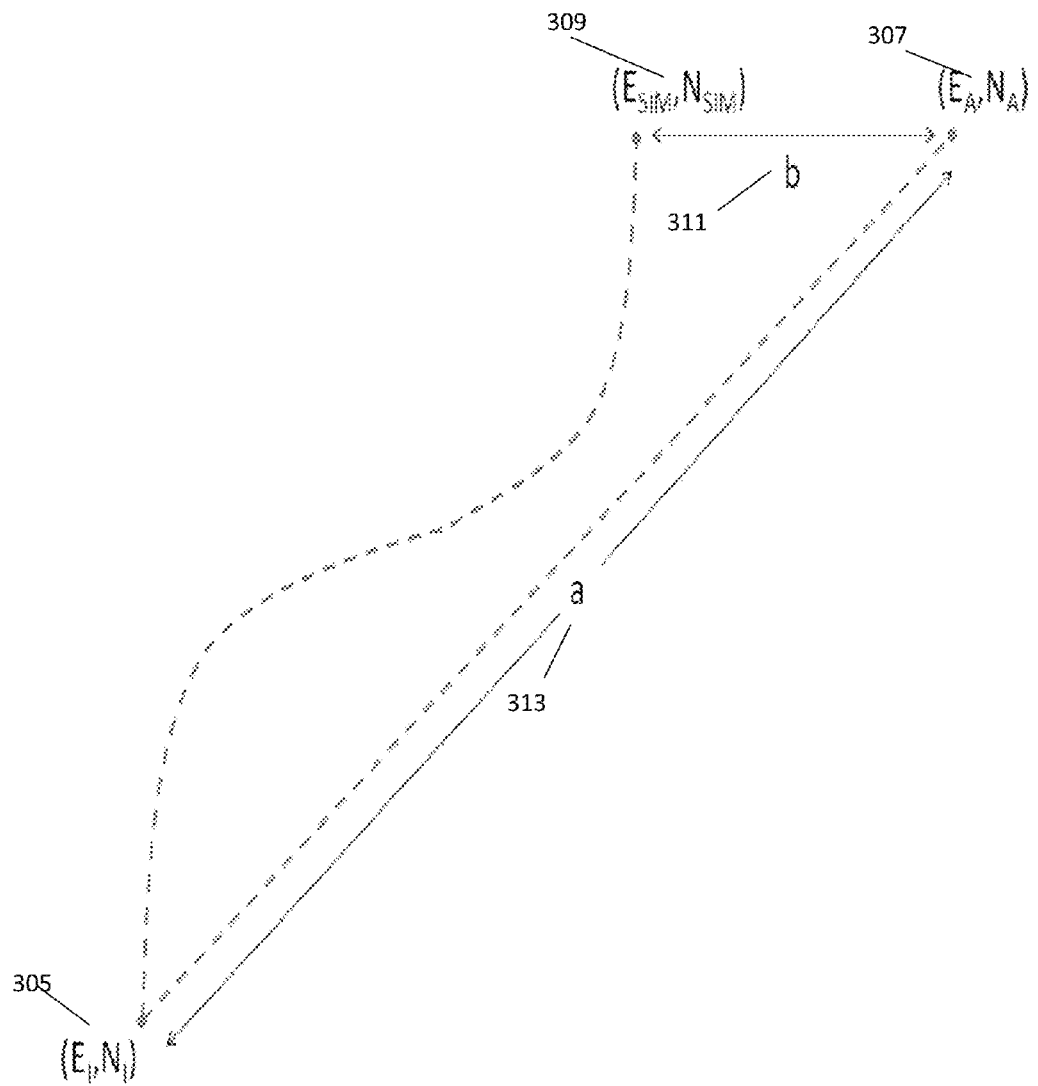
FIG. 5 is a graphic depiction of surface position prediction error.

Referring now to FIG. 5, $(E_I, N_I)$ 305 are the easting and northing coordinates of the initial glider position on the surface at the beginning of the dive for both the actual dive and the simulated dive. $(E_A, N_A)$ 307 are the coordinates of the surfacing position of the actual dive, and $(E_{SIM}, N_{SIM})$ 309 are the coordinates of the surfacing position given by the simulation. The linear distance covered by the actual dive is given by $a = \sqrt{(E_A - E_I)^2 + (N_A - N_I)^2}$ 313, and the distance between the actual surface position and the simulated surface position is given by $b = \sqrt{(E_A - E_{SIM})^2 + (N_A - N_{SIM})^2}$ 315. The normalized position prediction error is thus b/a.

Figure 6:
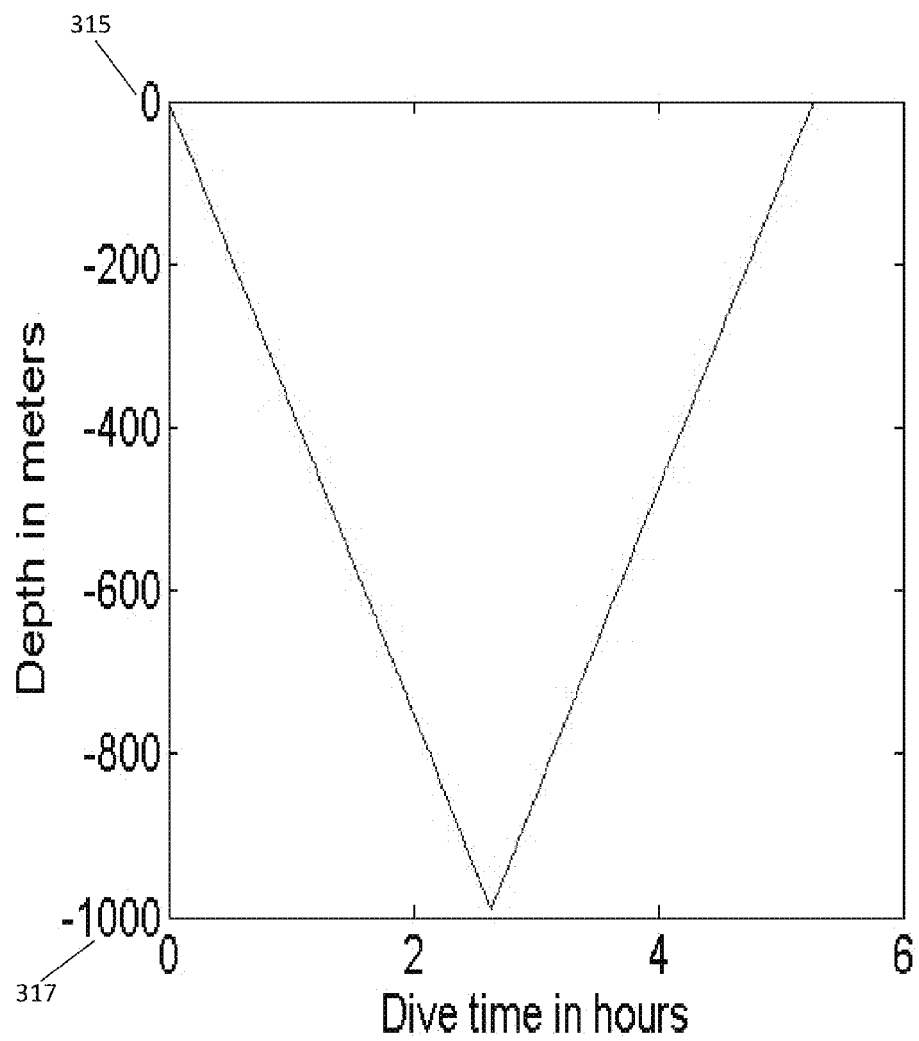
FIG. 6 is a graphical depiction of a vertical profile for a specific dive.

Referring now to FIG. 6, the vertical dive profile for a dive with currents is shown that goes from the surface 315 to a depth 317 of 1000 m and back to the surface in approximately 5.3 hrs. The simplified vehicle motion model used for these simulations assumes a constant vertical velocity for both descent and ascent, resulting in a symmetric 'V' shaped profile.

Figure 7:
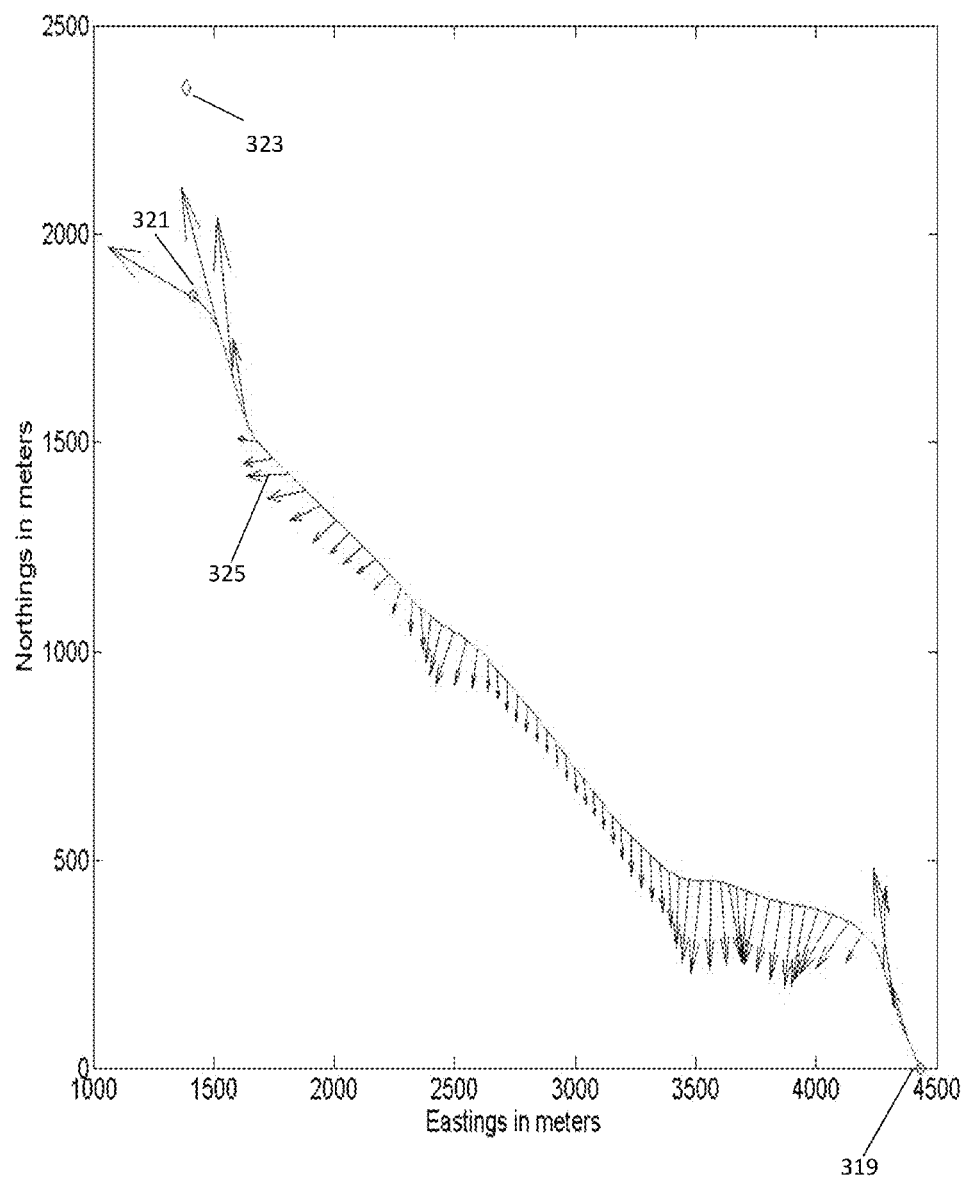
FIG. 7 is a graphical depiction of a simulated dive trajectory with forecast ocean currents.

Referring now to FIG. 7, the trajectory for a vehicle dive with currents is shown, using a 0.6 speed factor and a 0° heading bias. The actual and simulated dives start at the bottom right point 319 (red circle). The simulated dive ends at the top left point 321 (red circle) and the surfacing point of the actual dive ends at the black diamond point 323 (top left). The commanded vertical and horizontal speeds for the dive simulation (based on the actual dive log files) are, in the present embodiment, 0.104 m/s and 0.317 m/s respectively. The arrows 325 indicate the direction and speed of the currents throughout the dive which, for the present embodiment, have a maximum of 0.276 m/s at the surface, nearly the horizontal speed of the vessel, and a minimum of 0.005 m/s at depth. With the 0.6 scale factor applied, the simulated horizontal speed is 0.19 m/s, less than the surface current speed. The commanded heading for the vehicle was approximately northwest, towards it objective waypoint (not shown). From the figure we can see that the currents near the surface at the beginning of the dive are nearly north, causing the vessel trajectory to be roughly North-Northwest. As the vessel goes deeper the currents are still fairly strong but heading south, so the vessel takes more of a westerly trajectory. The currents grow even weaker as the vessel continues deeper and we see the desired Northwest trajectory towards the waypoint near the middle of the trajectory. As the vessel ascends the currents grow stronger and have more of a westerly direction, which do not appear to significantly alter the desired Northwest trajectory. Near the surface the currents grow quite strong towards the North and we see the glider trajectory making a significant jog to the north.

Figure 8:
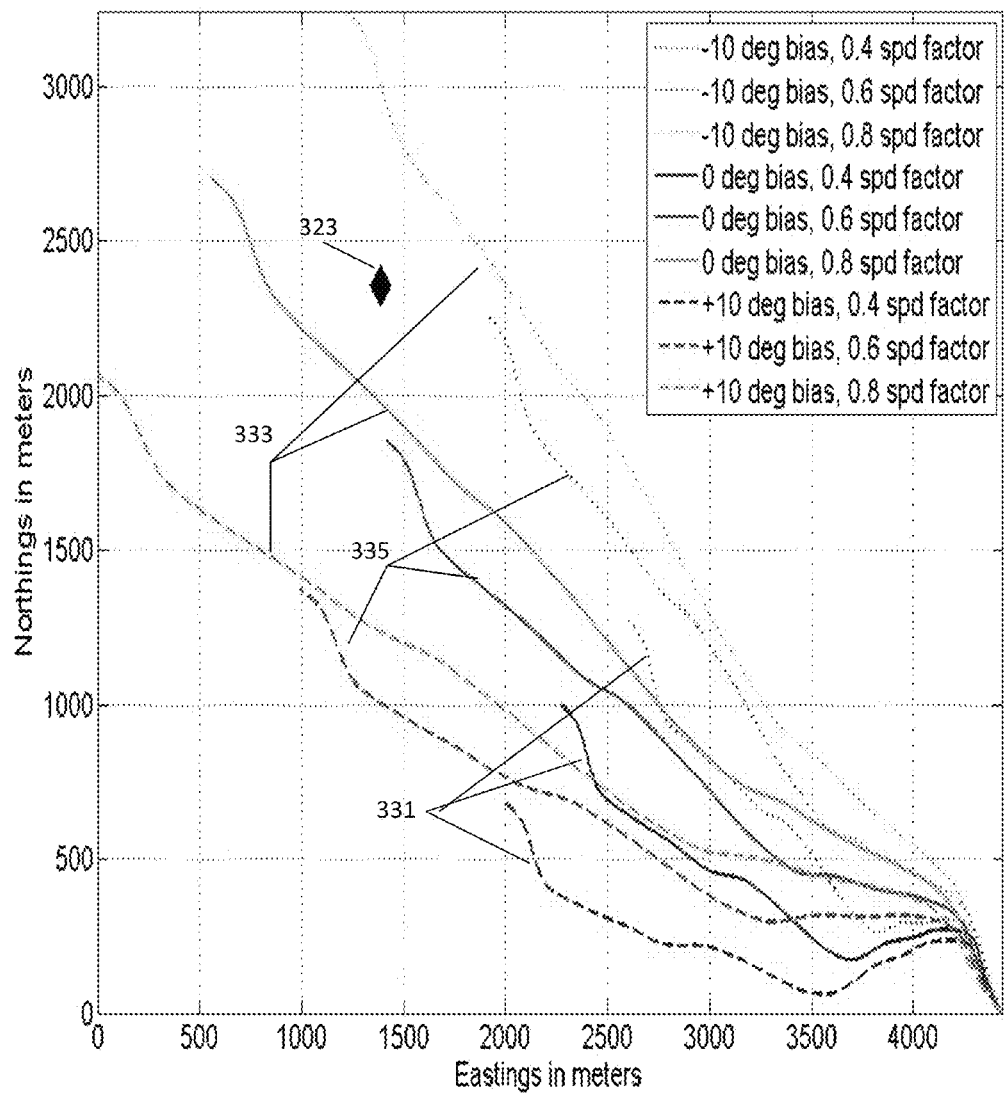
FIG. 8 is a graphical depiction of simulated dives with various heading biases and speed factors.

Referring now to FIG. 8, the simulated trajectory is shown for the dive with currents with nine combinations of heading bias and speed factor. The blue trajectories 331 (0.4 speed factor) fall well short of the actual surfacing point 323 (diamond) and the green trajectories 333 (0.8 speed factor) go past it. The three simulations 335 with a 0.6 speed factor are the closest, and we can see that a heading bias of about −5° should bring the simulation closest to the actual surfacing point for the speed factors shown. Looking at the shape of the trajectories, we see that higher vessel horizontal speeds (corresponding to larger speed factors) not only result in the vessel travelling further during the dive, but also result in a straighter path as the vessel speed is larger compared to the current. It is apparent from this figure that the surface position prediction error of the simulation can be reduced by adjusting the heading bias and speed factor.

Figure 9:
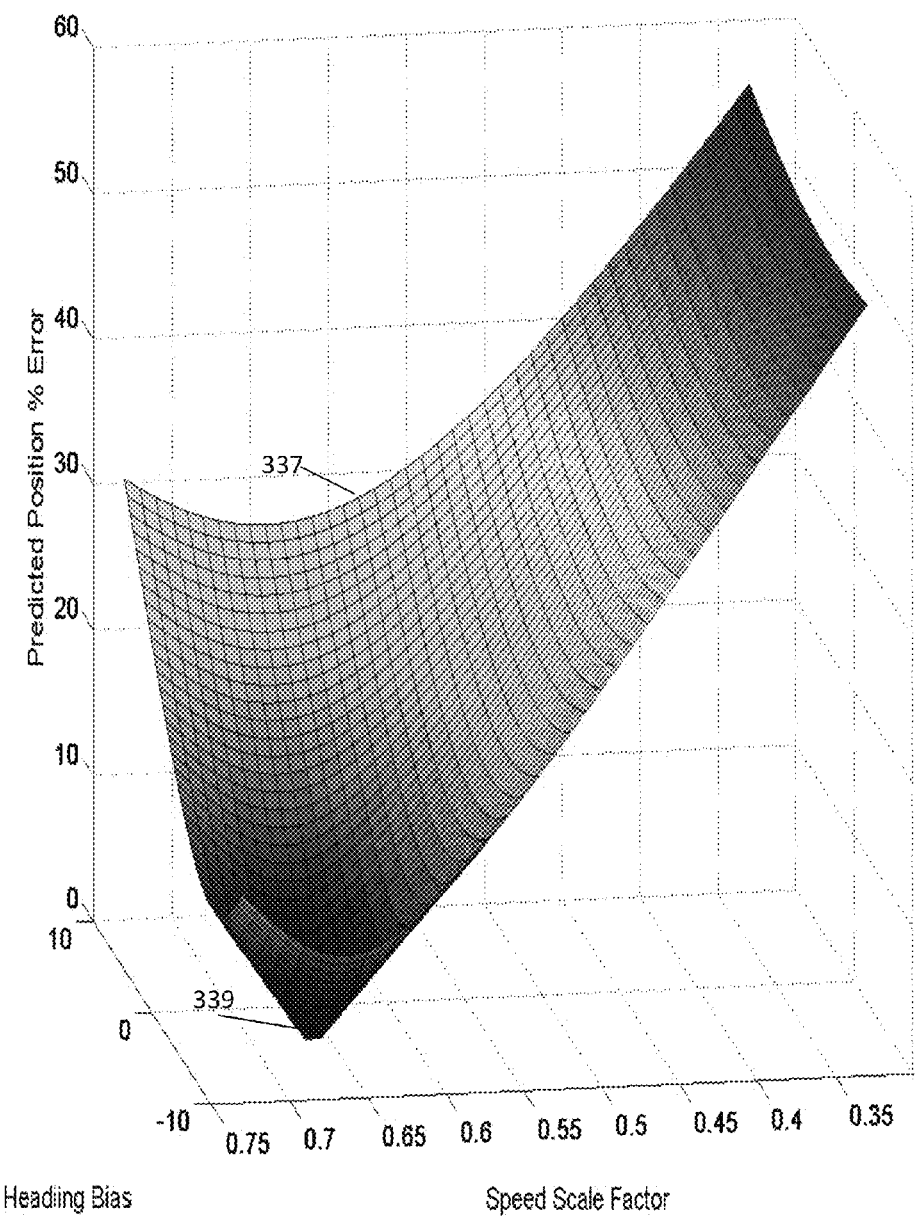
FIG. 9 is a graphical depiction of a surface position prediction error as a function of heading bias and speed scale factor.

Referring now to FIG. 9, the results of 1681 simulations are shown that were performed for the dive with currents. The surfacing position prediction error was computed for forty-one heading bias values ranging from −10° to +10° in 0.5° steps, and speed scale factor values ranging from 0.30 to 0.75 in steps of 0.01. These results show a smooth error surface 337 with a single minimum 339 indicating that computationally fast gradient techniques can be used to quickly find the heading bias and speed scale factors that correspond to a minimum prediction error after each vessel dive. For this dive, a heading bias of −4.5° and a speed scale factor of 0.66 yield a minimum prediction error less than 1%.

Figure 10:
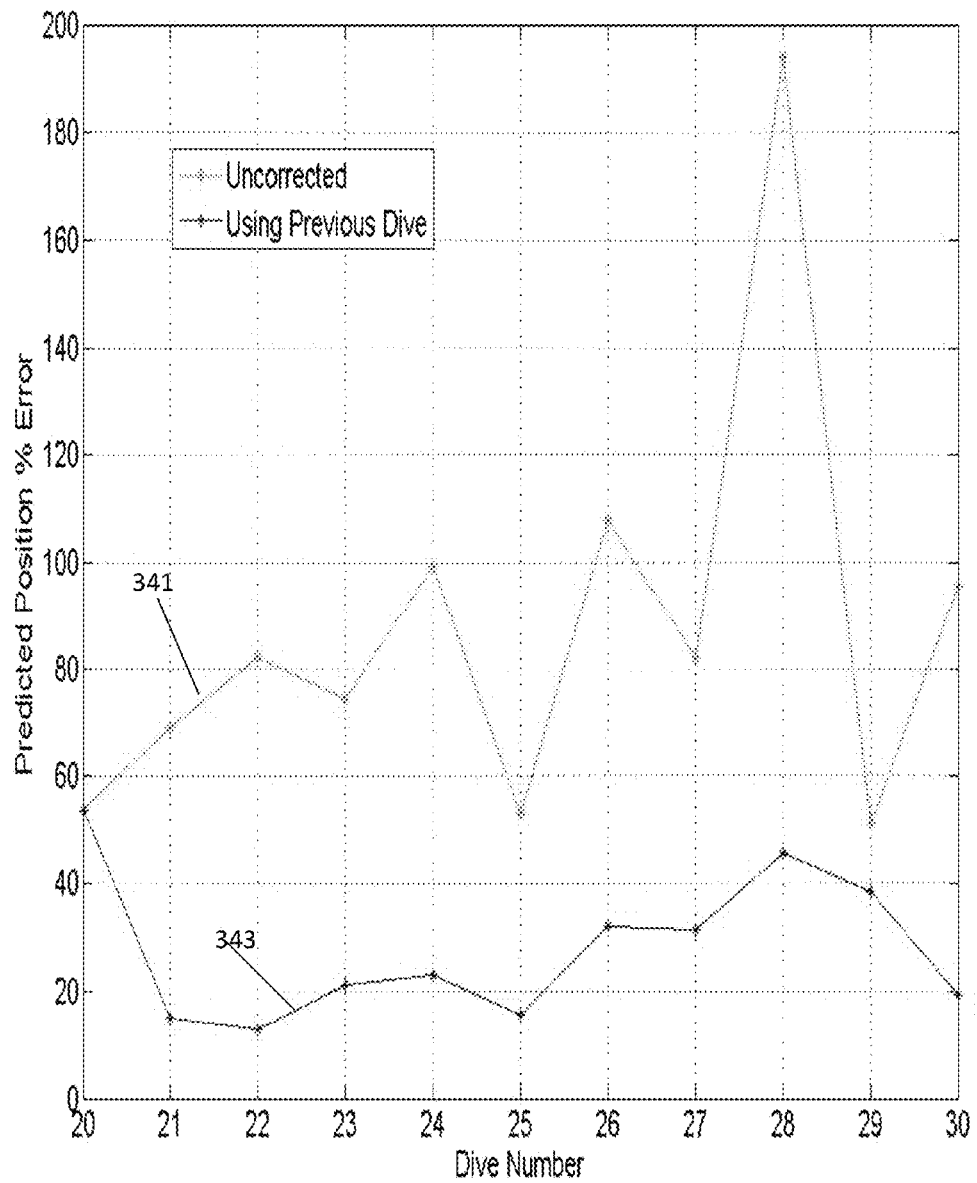
FIG. 10 is a graphical depiction of reducing prediction error using previous dive values.

Referring now to FIG. 10 the simulation normalized surface position prediction error for the dive with currents (dive 20), along with dives 21-30, is shown using 1) the commanded vessel horizontal speed and heading 341 (green line), i.e. no speed scale factor or heading bias, and 2) the commanded vessel horizontal speed and heading 343 (blue line) using the speed scale factor that minimizes the prediction error for the previous dive. This figure clearly demonstrates that a dramatically reduced prediction error can be obtained using the optimum speed scale factor computed for the previous dive.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system is written in FORTRAN and C. The system can operate on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIGS. 4A and 4B, method 150 can be, in whole or in part, implemented electronically. Signals representing actions taken by elements of system 100 (FIG. 3A) and system 200 (FIG. 3B) and other disclosed embodiments can travel over at least one live communications network 103 (FIG. 3A). Control and data information can be electronically executed and stored on at least one computer-readable medium. The system can be implemented to execute on at least one computer node 101 (FIG. 3A) in at least one live communications network 103 (FIG. 3A). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. An automated method for simulating a trajectory for a vehicle in a 4d fluid current field comprising:
    (a) receiving, into an electronic computer, simulation objectives and a forecasted current speed;
    (b) initializing, in the electronic computer, a simulation time, a heading of the vehicle, an up/down flag, a current speed, vehicle motion of the vehicle, a dynamic compensation factor, a vehicle position of the vehicle, a horizontal speed of the vehicle, a vertical speed of the vehicle, and a vehicle depth of the vehicle;
    (c) updating the simulation time in the electronic computer;
    (d) interpolating, in the electronic computer, the current speed based on the updated simulation time, the vehicle depth, the vehicle position, and the forecasted current speed;
    (e) computing, in the electronic computer, the vehicle depth based on the updated simulation time, the up/down flag, the simulation objectives, and the vertical speed of the vehicle;
    (f) computing, in the electronic computer, the vehicle position based on the updated simulation time, the heading, the horizontal speed, the interpolated current speed, the dynamic compensation factor, and the simulation objectives;
    (g) if a threshold is met and the vehicle motion is not drift mode, updating, in the electronic computer, the simulation objectives;
    (h) computing, in the electronic computer, the dynamic compensation factor based on vehicle velocity of the vehicle, the vehicle position, an external position fix of the vehicle position, and an actual velocity of the vehicle;
    (i) computing, in the electronic computer, the trajectory based on the vehicle depth and the vehicle position; and
    (j) repeating, in the electronic computer, steps (c)-(j) until a termination factor has been met.

2. The method as in claim 1 further comprising:
    selecting the simulation objectives from a group consisting of maximum depth, minimum depth, ascent rate, descent rate, and waypoints.

3. The method as in claim 1 further comprising:
    selecting the external position fix from a group consisting of a global positioning system position fix, an ultra-short baseline position fix, and a long baseline position fix.

4. The method as in claim 1 wherein the interpolating the current speed comprises:
    selecting a working bounding box from a second bounding box or forecast data from the forecast created if the vehicle position is not within an original bounding box of the forecast data, and the original bounding box; and
    interpolating the current speed based on the distance between the vehicle position and the working bounding box for each dimension of the working bounding box and pre-selected of U/V values in the bounding box.

5. The method as in claim 4 wherein the selecting the working bounding box comprises:
    selecting sixteen bounding points; and
    fetching the U/V values from the forecast data within the sixteen bounding points.

6. A system for simulating a trajectory for a vehicle in a 4d fluid current field comprising:
    a receiver/initializer receiving, into an electronic computer, simulation objectives and a forecasted current speed and initializing a simulation time, a heading of the vehicle, an up/down flag, a current speed, a vehicle motion of the vehicle, a dynamic compensation factor, a vehicle position of the vehicle, a horizontal speed of the vehicle, a vertical speed of the vehicle, and a vehicle depth of the vehicle;
    a simulation time processor updating the simulation time in the electronic computer;
    a current speed interpolator interpolating, in the electronic computer, the current speed based on the updated simulation time, the vehicle depth, the vehicle position, and the forecasted current speed;
    a vehicle position processor computing, in the electronic computer, the vehicle depth based on the updated simulation time, the up/down flag, the simulation objectives, and the vertical speed of the vehicle, and computing, in the electronic computer, the vehicle position based on the updated simulation time, the heading, the vehicle horizontal speed, the interpolated current speed, the dynamic compensation factor, and the simulation objectives;

a simulation objectives processor updating, in the electronic computer, the simulation objectives if a threshold is met and the vehicle motion is not drift mode;

a compensation factor processor computing, in the electronic computer, the dynamic compensation factor based on the vehicle velocity of the vehicle, the vehicle position, an external position fix of the vehicle position, and an actual velocity of the vehicle;

a trajectory processor computing, in the electronic computer, a trajectory based on the updated vehicle depth and the updated vehicle position; and a termination processor terminating if termination criterion (a) is/are met and returning, in the electronic computer, to the simulation time processor if the termination criterion(a) is/are not met.

7. The system as in claim 6 wherein the receiver/initializer comprises:

selecting the simulation objectives from a group consisting of maximum depth, minimum depth, ascent rate, descent rate, and waypoints, and selecting the external position fix from a group consisting of a global positioning system position fix, an ultra-short baseline position fix, and a long baseline position fix.

8. The system as in claim 6 wherein the current speed interpolator comprises:

selecting a working bounding box from a second bounding box of forecast data from the current forecast created if the vehicle position is not within an original bounding box of the forecast data, and the original bounding box; and interpolating the current speed based on the distance between the vehicle position and the working bounding box for each dimension of the working bounding box and pre-selected of U/V values in the bounding box.

9. The system as in claim 6 wherein the current speed interpolator comprises:

selecting sixteen bounding points; and fetching U/V values from the forecast data within the sixteen bounding points.

10. A computer-based method for simulating a trajectory for a vehicle in a 4d fluid current field comprising:

(a) determining, by an electronic computer, simulation objectives and a forecasted current speed, a simulation time, a heading of the vehicle, an up/down flag indicating if the vehicle is headed toward a fluid surface, a current speed, vehicle motion of the vehicle, a dynamic compensation factor, a vehicle position of the vehicle, a horizontal speed of the vehicle, a vertical speed of the vehicle, and a vehicle depth of the vehicle;

(b) updating the simulation time in the electronic computer;

(c) if a threshold is met and the vehicle motion is not drift mode, updating, in the electronic computer, the simulation objectives;

(d) interpolating, in the electronic computer, the current speed based on the updated simulation time, the vehicle depth, the vehicle position, and the forecasted current speed;

(e) updating, in the electronic computer, the vehicle depth based on the updated simulation time, the up/down flag, the updated simulation objectives, and the vertical speed of the vehicle;

(f) updating, in the electronic computer, the vehicle position based on the updated simulation time, the heading, the horizontal speed, the interpolated current speed, the dynamic compensation factor, and the updated simulation objectives;

(g) computing, in the electronic computer, the trajectory based on the updated vehicle depth and the updated vehicle position; and (h) repeating, in the electronic computer, steps (b)-(g) until a termination factor has been met.

11. The method as in claim 10 wherein the simulation objectives are selected from a group consisting of maximum depth, minimum depth, ascent rate, descent rate, and waypoints.

12. The method as in claim 10 wherein the external position fix is selected from a group consisting of a global positioning system position fix, an ultra-short baseline position fix, and a long baseline position fix.

13. The method as in claim 10 wherein the interpolating the current speed comprises:

selecting a working bounding box from a second bounding box of forecast data from the forecast created if the vehicle position is not within an original bounding box of the forecast data, and the original bounding box; and interpolating the current speed based on the distance between the vehicle position and the working bounding box for each dimension of the working bounding box and pre-selected of U/V values in the bounding box.

14. The method as in claim 13 wherein the selecting the working bounding box comprises:

selecting sixteen bounding points; and fetching the U/V values from the forecast data within the sixteen bounding points.

* * * * *